US009623473B2

(12) United States Patent
Friedrich et al.

(10) Patent No.: US 9,623,473 B2
(45) Date of Patent: Apr. 18, 2017

(54) METHOD FOR PRODUCING A RING-PULL TOP FROM A STEEL SHEET PROVIDED WITH A PROTECTIVE LAYER AND A RING-PULL TOP PRODUCED THEREBY

(71) Applicant: THYSSENKRUPP RASSELSTEIN GMBH, Andernach (DE)

(72) Inventors: Karl Ernst Friedrich, Moers (DE); Dirk Matusch, Neuwied (DE); Burkhard Kaup, Andernach (DE); Reiner Sauer, Neuwied (DE)

(73) Assignee: THYSSENKRUPP RASSELSTEIN GMBH, Andernach (DE)

( * ) Notice: Subject to any disclaimer, the term of this patent is extended or adjusted under 35 U.S.C. 154(b) by 183 days.

(21) Appl. No.: 14/367,707

(22) PCT Filed: Oct. 2, 2012

(86) PCT No.: PCT/EP2012/069464
§ 371 (c)(1),
(2) Date: Jun. 20, 2014

(87) PCT Pub. No.: WO2013/091922
PCT Pub. Date: Jun. 27, 2013

(65) Prior Publication Data
US 2015/0258599 A1    Sep. 17, 2015

(30) Foreign Application Priority Data

Dec. 22, 2011    (DE) .................. 10 2011 056 846

(51) Int. Cl.
*C21D 1/26*       (2006.01)
*B21D 51/38*     (2006.01)
(Continued)

(52) U.S. Cl.
CPC ......... *B21D 51/383* (2013.01); *B65D 17/163* (2013.01); *C21D 1/18* (2013.01);
(Continued)

(58) Field of Classification Search
CPC ...... B21D 51/38; B21D 51/383; B21D 51/44; B21D 51/443; C21D 6/00; C21D 6/004;
(Continued)

(56) References Cited

U.S. PATENT DOCUMENTS 3,378,360 A       4/1968   McFarland
4,280,427 A  *    7/1981   Potts ................... B65D 17/165
                                                           413/15
(Continued)

FOREIGN PATENT DOCUMENTS

CH       469810      3/1969
DE      2010631      9/1971
(Continued)

OTHER PUBLICATIONS

Office Action dated Aug. 4, 2015 for Japanese Patent Application No. 2014-547777.
(Continued)

*Primary Examiner* — Edward Tolan
(74) *Attorney, Agent, or Firm* — Paul D. Bianco; Katharine Davis; Fleit Gibbons Gutman Bongini & Bianco PL

(57) ABSTRACT

The invention relates to the use of a steel sheet provided with a protective layer for producing a ring-pull top or a can having a ring-pull top, where the steel sheet is made of an unalloyed or low-alloy steel having a carbon content of less than 0.1% by weight, and also an associated process. The problem proceeding from known steel sheets having a protective layer, namely to provide a steel sheet by means of which ring-pull tops which for a constant residual wall (Continued)

thickness of the notch line have a lower tear-off force can be produced by means of the ring-pull top, is solved by the steel sheet being recrystallizingly heat treated at a heating rate of more than 75 K/s and after the recrystallizing heat treatment cooled at a cooling rate of at least 100 K/s and then coated with the protective layer.

7 Claims, 3 Drawing Sheets

(51) Int. Cl.

| | |
|---|---|
| C21D 9/00 | (2006.01) |
| C21D 1/42 | (2006.01) |
| C22C 38/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| B65D 17/00 | (2006.01) |
| C21D 1/18 | (2006.01) |
| C21D 6/00 | (2006.01) |
| C22C 38/08 | (2006.01) |
| C22C 38/12 | (2006.01) |
| C22C 38/14 | (2006.01) |
| C22C 38/16 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| B21D 51/44 | (2006.01) |
| C21D 9/46 | (2006.01) |

(52) U.S. Cl.
CPC ............... *C21D 1/26* (2013.01); *C21D 1/42* (2013.01); *C21D 6/005* (2013.01); *C21D 6/008* (2013.01); *C21D 9/0068* (2013.01); *C22C 38/00* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *B21D 51/443* (2013.01); *C21D 9/46* (2013.01); *C21D 2211/002* (2013.01); *C21D 2211/005* (2013.01); *C21D 2211/008* (2013.01); *Y02P 10/253* (2015.11)

(58) Field of Classification Search
CPC .... C21D 6/008; C21D 8/0273; C21D 8/0473; C21D 2211/005; C21D 1/26; C21D 1/42; C21D 9/46; C22C 38/00; C22C 38/02; C22C 38/04; C22C 38/06
See application file for complete search history.

(56) References Cited

U.S. PATENT DOCUMENTS

| | | | |
|---|---|---|---|
| 4,930,658 A | 6/1990 | McEldowney | |
| 6,692,584 B2 * | 2/2004 | Sakata | C21D 8/0273 148/320 |
| 7,503,984 B2 | 3/2009 | Yokoi | |
| 7,506,529 B2 * | 3/2009 | Bauer | B21D 51/38 413/8 |
| 8,430,975 B2 * | 4/2013 | Nakagaito | C21D 1/25 148/320 |
| 8,864,921 B2 * | 10/2014 | Wu | C21D 1/42 148/533 |
| 8,882,936 B2 * | 11/2014 | Hasegawa | C21D 8/00 148/320 |
| 9,109,275 B2 * | 8/2015 | Morimoto | B22D 11/115 |
| 9,200,352 B2 * | 12/2015 | Saito | C21D 8/0405 |
| 2004/0244877 A1 | 12/2004 | Yokoi | |
| 2010/0044932 A1 * | 2/2010 | Sugano | C21D 1/42 266/111 |
| 2012/0085467 A1 * | 4/2012 | Thirion | B32B 15/012 148/525 |

FOREIGN PATENT DOCUMENTS

| | | | |
|---|---|---|---|
| DE | 3512687 | 10/1986 | |
| DE | 4240373 | 6/1994 | |
| DE | 60224557 | 12/2008 | |
| EP | 0381888 | 8/1990 | |
| JP | 61-284530 A * | 12/1986 | ............... C21D 9/46 |
| JP | 62256942 | 11/1987 | |
| JP | S6314818 | 1/1988 | |
| JP | H10251799 A | 9/1998 | |
| JP | 11-217651 | 8/1999 | |
| JP | 2004-277858 | 10/2004 | |
| JP | 2005-163055 A * | 6/2005 | ............ C22C 38/00 |
| JP | 2008-285718 | 11/2008 | |
| JP | 2010-59442 | 3/2010 | |

OTHER PUBLICATIONS

Examination Report for DE 10 2011 056 846.8 filed Dec. 22, 2011.
XP002689556, abstract, Y. Furuno et al, Apr. 28, 1986, Nippon Steel Corp.
International Search Report dated Jan. 9, 2013 for PCT/EP2012/069464 filed Oct. 2, 2012.
Written Opinion for PCT/EP2012/069464 filed Oct. 2, 2012.
XP002689556, Y. Furuno et al, vol. 1987, Nr.: 50, 1987, Nippon Steel Corp.
International Preliminary Report on Patentability published Jun. 22, 2014 for PCT/EP2012/069464.

* cited by examiner

METHOD FOR PRODUCING A RING-PULL TOP FROM A STEEL SHEET PROVIDED WITH A PROTECTIVE LAYER AND A RING-PULL TOP PRODUCED THEREBY

FIELD OF THE INVENTION

The invention pertains to the use of a steel sheet provided with a protective layer for producing a ring-pull top or a can with a ring-pull top. The invention furthermore pertains to a method for producing a ring-pull top of a steel sheet provided with a protective layer.

BACKGROUND OF THE INVENTION

Cans that can be easily opened without the aid of tools are very popular for packaging foods and beverages. Such cans feature a ring-pull top that can be pulled open along a notch in the material of the can by means of a manually operable tab. A beverage can of metal with a ring-pull top that can be pulled open along a notch line by means of a pull-tab is known, e.g., from EP 0 381 888-A.

Such cans with a ring-pull top are usually produced from either aluminum sheets or a steel sheet that is provided with a corrosion-resistant protective layer. Due to the lower costs, coated steel sheets have certain advantages over aluminum. However, it was determined that ring-pull tops of sheet steel require a higher force for tearing off the ring-pull top than ring-pull tops of aluminum.

DE 35 12 687 C2 discloses a method for producing steel sheets for easily openable can tops, by means of which a ring-pull top can be produced that makes it possible to easily open the can without excessively reducing the remaining metal wall thickness in the region of the notch. For this purpose, DE 35 12 687 C2 proposes to use a steel with a carbon content in the range between 0.01 wt % and 0.051 wt % and the alloying constituents silicon in an amount between 0.01 and 0.02 wt %, manganese in an amount between 0.32 and 0.35 wt %, phosphorus in an amount between 0.018 and 0.022 wt % and aluminum in an amount between 0.07 and 0.09 wt %. The steel is initially hot-rolled, then annealed after a cold-rolling step and subsequently subjected to a second cold-rolling step. After the cold-rolling, the steels are cleaned, tin-plated in a molten tin bath and subsequently finished for the production of a ring-pull top.

Other methods for producing ring-pull tops from steel sheets are known from DE 20 10 631 and DE 42 40 373 A1, wherein lines for a plurality of ring-pull tops are initially scored on a steel plate or a steel strip, and wherein the pre-scored plate or the pre-scored strip is then coated with a protective layer and the ring-pull tops are subsequently stamped out. A coat of lacquer or tin plating or chromium plating of the steel sheet, or even a plastic film that is laminated onto the plate or the strip as proposed in DE 42 40 373 A1, may be considered as protective layer. The protective layer may be applied onto one or both sides and provides the steel strip or steel sheet with a high corrosion stability such that cans produced from it can also be used for packaging aggressive foods or beverages.

SUMMARY OF THE INVENTION

The invention is based on the objective of making available a steel sheet for producing ring-pull tops that, at constant residual wall thickness of the notch line, require a lower tear-off force than the ring-pull tops of sheet steel known from the prior art.

This objective is attained with the use of a steel sheet provided with a protective layer for producing ring-pull tops as disclosed herein, as well as with the method for producing a ring-pull top as also disclosed herein. Preferred embodiments of the use and the method are also disclosed.

The invention proposes the use of a steel sheet provided with a protective layer for the production of a ring-pull top, wherein the steel sheet is made of an unalloyed or low-alloy steel with a carbon content of less than 0.1 wt % and prior to the application of the protective layer, the steel sheet is subjected to a heat treatment, in which the steel sheet is initially annealed in a recrystallizing (and austenitizing) fashion at a heating rate of more than 75 K/s, preferably more than 200 K/s, and subsequently cooled at a cooling rate of at least 100 K/s. After this heat treatment, the steel sheet is coated with a protective layer and then processed for the production of ring-pull tops or for the production of cans with a ring-pull top in conventional fashion. In the following description, the term steel sheet refers to plates or strips (particularly strips wound into coils) of steel.

The most suitable steel for the production of inventive ring-pull tops preferably contains less than 0.5 wt %, particularly less than 0.4 wt %, manganese, less than 0.04 wt % silicon, less than 0.1 wt % aluminum and less than 0.1 wt % chromium. The steel may contain alloying additions of boron and/or niobium and/or titanium in order to increase the strength, wherein the addition of boron preferably lies in the range of 0.001-0.005 wt % and the addition of niobium or titanium preferably lies in the range of 0.005-0.05 wt %.

A heat treatment of the steel sheet by means of electromagnetic induction proved particularly suitable for the recrystallizing annealing of the steel sheet. Comparative tests made it possible to demonstrate that steel sheets heat-treated by means of electromagnetic induction achieved the best results with respect to the tear-off force, i.e. required the lowest tear-off force, in the subsequent production of ring-pull tops. In analyses of the heat-treated steel sheet, it was determined that, after the cooling process, steel sheets annealed in a recrystallizing fashion by means of electromagnetic induction have a multi-phase structure that comprises ferrite and at least one of the structural constituents martensite or bainite. Steel sheets treated in accordance with the invention, in which at least 80%, preferably more than 95%, of the structural constituent consist of ferrite, martensite, bainite and/or residual austenite, proved to be particularly suitable materials for the production of easily openable ring-pull tops.

The preferred starting material used for carrying out the inventive method for producing a ring-pull top is a cold-rolled thin sheet or extra-thin sheet, in which the weight proportions of the alloying constituents preferably have the following upper limits:

C: 0.1%,
N: 0.02%,
Mn: 0.5%,
Si: 0.04%,
Al: 0.1%,
Cr: 0.1%,
P: 0.03%,
Cu: 0.1%,

Ni: 0.1%,
Sn: 0.04%,
Mo: 0.04%,
other alloying constituents: 0.05%,
remainder iron.

In this context, the term thin sheet refers to a sheet with a thickness of less than 3 mm and an extra-thin sheet has a thickness of less than 0.5 mm. Despite their low content of manganese, silicon, aluminum and/or chromium, steels with the cited alloying composition have, after the inventive heat treatment, a very high tensile strength of at least 500 MPa and at the same time a high percentage elongation at fracture of more than 6%, usually more than 10%. It was surprisingly determined that after the inventive heat treatment, steel sheets with such a composition are superbly suitable for the production of easily openable ring-pull tops that require comparatively low tear-off forces for opening the top.

BRIEF DESCRIPTION OF THE DRAWINGS

An embodiment example of the invention is described in greater detail below with reference to the accompanying drawings. In these drawings.

DETAILED DESCRIPTION OF THE INVENTION

Continuously cast and hot-rolled steel strips that were wound into coils and consisted of steels with the following composition were used for the production of a steel sheet from which ring-pull tops can be produced in accordance with the invention:
C: max. 0.1%;
N: max. 0.02%;
Mn: max. 0.5%, preferably less than 0.4%;
Si: max. 0.04%, preferably less than 0.02%;
Al: max. 0.1%, preferably less than 0.05%;
Cr: max. 0.1%, preferably less than 0.05%;
P: max. 0.03%;
Cu: max. 0.1%;
Ni: max. 0.1%;
Sn: max. 0.04%;
Mo: max. 0.04%;
V: max. 0.04%;
Ti: max. 0.05%, preferably less than 0.02%;
Nb: max. 0.05%, preferably less than 0.02%;
B: max. 0.005%;
other alloying constituents and impurities: max. 0.05%, remainder iron.

Steel sheets of this type were initially subjected to a thickness reduction of 50% to 96% by being cold-rolled to a final thickness of about 0.5 mm and subsequently annealed in a recrystallizing fashion by means of inductive heating in an induction furnace.

Figure 5:
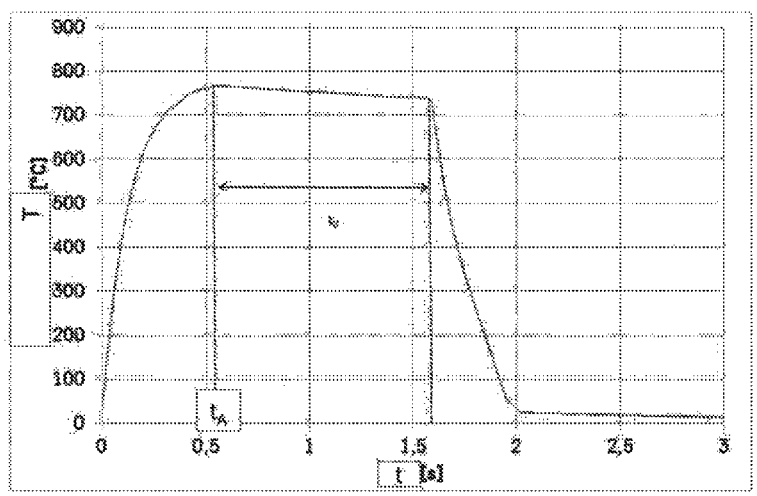

In this case, an induction coil with a power of 50 kW at a frequency of f=200 kHz was used, e.g., for a sample size of 20×30. A typical annealing curve is illustrated in FIG. 5. According to the annealing curve in FIG. 5, the steel strip was heated to a maximum temperature $T_{max}$ above the $A_1$ temperature ($T(A_1) \approx 725°$ C.) within a very short heating time $t_A$ that typically lies between approximately 0.5 s and 10 s. The maximum temperature $T_{max}$ lies above the phase transition temperature $T_f$ of the ferromagnetic phase transition ($T_f \approx 770°$ C.). The temperature of the steel strip was then maintained at a temperature value above the $A_1$ temperature for an annealing period $t_G$ of approximately 0.75-1 second. During this annealing period $t_G$, the steel strip, slightly cooled from its maximum temperature $T_{max}$, e.g., of 750° C. to the $A_1$ temperature (approximately 725° C.). Subsequently, the steel strip was cooled to room temperature (approximately 23° C.) within a cooling interval of approximately 0.25 seconds by means of a fluid cooling process that may be carried out, for example, with the aid of a water-cooling system or an air-cooling system. If so required, an additional cold-rolling step with a thickness reduction of up to 40% may be carried out after the cooling process.

The thus treated steel sheet was subsequently examined with respect to its strength and its percentage elongation at fracture. Comparative tests showed that the percentage elongation at fracture was in all instances higher than 6% and usually higher than 10%, and that the tensile strength amounted to at least 500 MPa and in many instances even exceeded 650 MPa.

Color etching according to Klemm made it possible to confirm that the steel sheets treated in accordance with the invention have an alloying structure that features ferrite as soft phase and martensite and, if applicable, bainite as hard phase.

It was furthermore determined in comparative tests that the best results with respect to strength and ductility are achieved if the heating rate during the recrystallizing inductive annealing lies between 200 K/s and 1200 K/s, and if the steel strip annealed in a recrystallizing fashion is subsequently cooled at a cooling rate of more than 100 K/s. With respect to the cooling system, cooling rates between 350 K/s and 1000 K/s are advantageous because an elaborate water-cooling system is not required in this case and the cooling process can be carried out by means of a cooling gas such as air. However, the best results with respect to the material properties were achieved by using a water-cooling system with cooling rates in excess of 1000 K/s.

The steel sheet of the invention is superbly suitable for use as packaging steel. For example, ring-pull tops for preserved food or beverage cans with ring-pull tops can be produced from the heat-treated steel sheets. Since the requirements with respect to the corrosion resistance of packages are particularly strict in the food industry, it is advantageous to provide the steel sheet produced in accordance with the invention with a metallic and corrosion-resistant coating, for example, by means of electrolytic tin plating or chromium plating, after the heat treatment and, if applicable, after an ensuing cold-rolling step. However, it can also be conceived to use other coating processes such as, e.g., galvanizing or lacquering or even laminating on a plastic film. In this case, the coating may be applied on one or both sides depending on the respective requirements.

With respect to its strength and ductility, the steel sheet used for the inventive production of ring-pull tops is comparable to the dual phase steels known from the automobile industry. In comparison with the dual phase steels known from the automobile industry, however, the steel sheet used for the inventive production of ring-pull tops is characterized, in particular, by significantly lower production costs and the advantage that a steel with lower alloying concentration and few alloying constituents is used such that contaminations of the packaged foods due to diffusion of the alloying constituents can be prevented.

Ring-pull tops for preserved food or beverage cans were produced from the steel strips or plate-shaped steel sheets produced and heat-treated in the above-described fashion. Subsequently, the steel strip or steel plate was coated with a protective surface layer on one or both sides. The protective layer may be applied, for example, by means of lacquering or galvanizing. The protective layer may consist of a metallic coating, for example of tin or chromium, that can be applied, e.g., with an electrolytic coating process. However, it may also consist of one or more coats of lacquer or of a plastic film that is applied onto the surface of the steel sheet on one or both sides by means of a laminating process.

Figure 1:
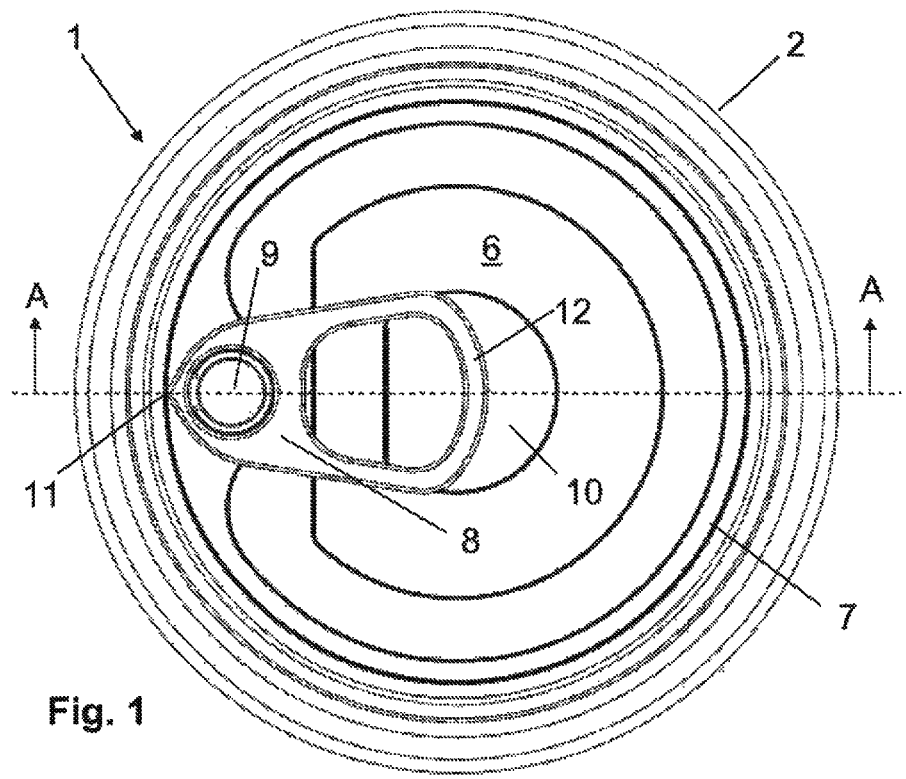
FIG. 1 shows a top view of a ring-pull top.
Figure 2:
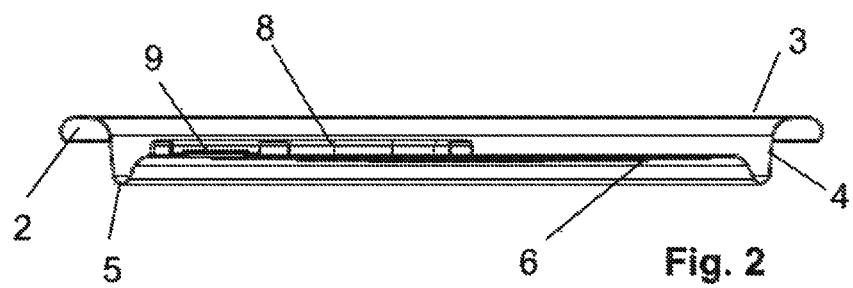
FIG. 2 shows a section through the ring-pull top of FIG. 1 along the line A-A.

After the application of the protective layer, tops were stamped out of the steel sheet and scored (i.e. provided with a score line) in order to obtain a top of the type illustrated in FIGS. 1 and 2.

The circular top 1 illustrated in FIGS. 1 and 2 comprises a flanged edge region 2 that serves for fixing the top on the cylindrical body of a can by means of lock-seaming. The flanged edge region 2 is adjoined by an annular transition region 3 that essentially extends horizontally and is adjoined by a section 4 that is bent vertically downward. The section 4 ends in a groove-shaped bead 5 adjoined by a central region 6 that essentially extends horizontally. The central region 6 is surrounded by a score line 7 that continuously extends over the entire circumference. The score line consists of a material-thinning notch that advantageously has a triangular or trapezoidal cross section with a straight or oblique notch root and with a residual wall thickness in the range between 50 and 100 µm. The score line 7 serves for tearing off the ring-pull top by separating the central region 6 from the outer region 2, 3, 4 of the top 1 along the score line 7.

A pull-tab 8 with a pulling ring 12 is fixed in the central region 6 by means of a rivet 9, wherein the rivet is formed from the top (i.e., drawn from the material of the top). A depression 10 is provided in the central region 6 in order to take hold of the pull-tab 8. The pull-tab 8 can be manually pulled up on its pulling ring 12, wherein the pointed end 11 of the pull-tab 8 that lies opposite the pulling ring 12 punctures the notch line 7 in order to initially produce a local slot in the notch line. The notch line 7 is ultimately opened along its entire circular circumference by pulling on the pulling ring 12 of the pull-tab 8 such that the central region 6 of the ring-pull top is separated from the outer region and an opening is exposed in the ring-pull top.

Figure 3:
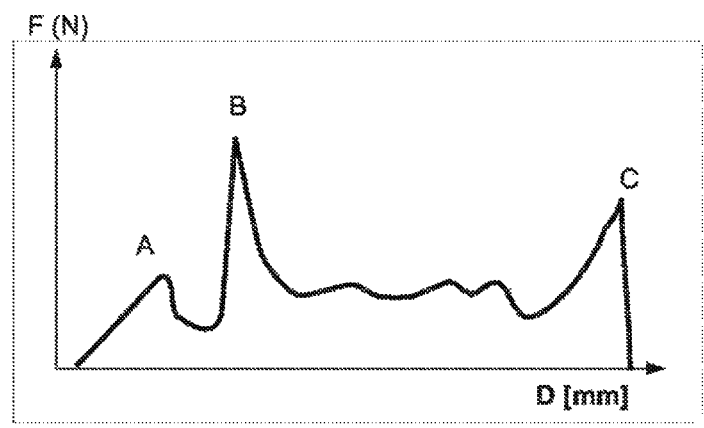
FIG. 3 schematically shows a typical curve of the tear-off forces required for pulling open a ring-pull top along the notch line.

FIG. 3 shows a typical curve of the aforementioned forces F (in Newtons) for tearing off a full ring-pull top, wherein said forces are plotted as a function of the tear-off distance D along the notch line. The force required for puncturing a local slot into the notch line 7 when the pull-tab 8 is initially lifted is referred to as score breaking force or opening force A ("score brake"). The force required for completely opening the notch line 7 by pulling on the pull-tab 8 is referred to as tearing force or score tearing force B ("score tear"). In order to separate the central region 6 from the outer edge region, a force referred to as tear-off force C ("tear-off") is ultimately also required for completely exposing the opening in the ring-pull top by pulling off the central region 6.

Figure 4:
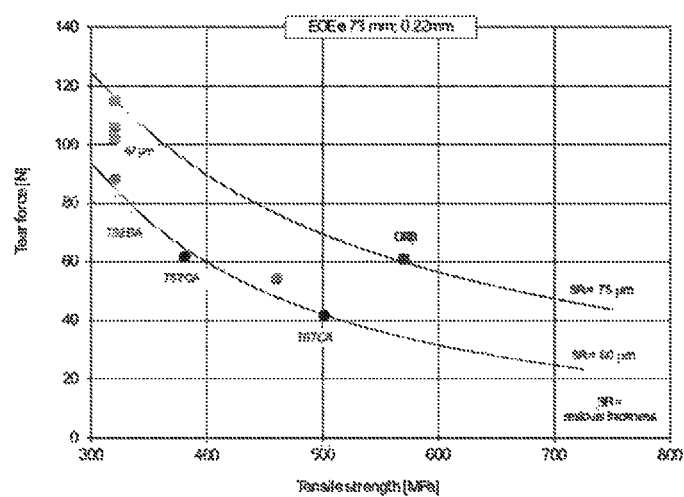
FIG. 4 shows the dependence of the tear-off forces required for pulling open a ring-pull top on the tensile strength of the steel sheet used, and
FIG. 5 schematically shows a typical annealing curve (temperature T of the steel sheet in dependence on the time t in seconds) for the recrystallizing heat treatment of the steel sheet used for the inventive ring-pull top.

Until now, it was assumed that the forces required for opening a ring-pull top decrease as the tensile strength increases if the residual wall thickness in the region of the notch line is constant. FIG. 4 shows a typical curve of the (maximum) score tearing force B ("maximum score tear") in dependence on the tensile strength of the steel sheet used for the production of the ring-pull top for two different residual wall thicknesses SR (SR=75 µm and SR=60 µm) of a cover with a diameter of 73 mm and a steel sheet thickness of 0.22 mm.

During the course of comparative tests that were carried out with the ring-pull tops produced in accordance with the invention, it was determined that there also exist other influencing variables for the score tearing forces. For example, the score tearing force is also highly dependent on the carbon content of the steel sheet used. The lower the carbon content of the steel sheet used, the higher the required score tearing force. It was furthermore determined that the forces required for opening a ring-pull top, particularly the maximum score tearing force, is lower if a steel sheet that was heat-treated in accordance with the invention is used for producing the ring-pull top. The steel sheets used for producing the ring-pull tops in accordance with the invention have a multi-phase structure that comprises at least martensite as hard structural phase. It is assumed that this hard martensite phase initiates an early material failure when the ring-pull top is opened and in this way significantly reduces the score tearing forces. At a residual wall thickness of 60 µm and a tensile strength of the steel sheet used of 500 MPa, ring-pull tops produced in accordance with the invention have maximum score tearing forces, e.g., in the range of 40 N or less.

The invention is not limited to the embodiment example illustrated in the figures, wherein said illustrations were merely provided for describing the invention in greater detail. The steel sheet proposed for producing ring-pull tops in accordance with the invention is equally suitable for the production of ring-pull tops with a different design, as well as for the production of cans with a ring-pull top. For example, it would also be possible to accordingly produce ring-pull tops according to the invention in which the tear-off part is not completely removed from the top, but merely pushed into the interior of the can with the pull-tab. Furthermore, the ring-pull tops may also have a different shape, e.g. an oval shape, and the notch line may likewise have a different shape, e.g. an oval or helical or spiral shape.

The invention claimed is:

1. A method for producing a ring-pull top comprising:
   providing an uncoated, cold-rolled steel sheet made of an unalloyed or low-alloy steel having a carbon content of less than 0.1 wt %, a manganese content of less than 0.4 wt %, a silicon content of less than 0.04 wt %, an aluminum content of less than 0.1 wt %, and a chromium content of less than 0.1 wt %;
   heating the uncoated, cold-rolled steel sheet using electromagnetic induction at a heating rate of more than 75 K/s for recrystallization annealing;
   cooling the heated steel sheet at a cooling rate of at least 100 K/s;
   coating the cooled steel sheet with a protective layer; and
   stamping a top out of the steel sheet and scoring the top to produce the ring-pull top.

2. The method according to claim 1, further comprising, resulting from the recrystallization annealing and cooling, forming a multi-phase structure in the cooled steel sheet, the multi-phase structure including ferrite and at least one structural constituent selected from the group consisting of martensite, bainite, residual austenite, and combinations thereof.

3. The method according to claim 1, wherein the cooling includes cooling the heated steel sheet at a cooling rate higher than 500 K/s.

4. The method according to claim 1, wherein coating includes coating the cooled steel sheet with a protective layer of tin, chromium, aluminum, zinc, or zinc/nickel.

5. The method according to claim 1, where the providing an uncoated, cold-rolled steel sheet includes providing a low-alloy steel sheet having upper limits for weight proportions of alloying constituents as follows: N: 0.02%; Mn: 0.4%; Si 0.04%; Al: 0.1%; Cr: 0.1%; P: 0.03%; Cu: 0.1%; Ni: 0.1%; Sn: 0.04%; Mo: 0.04%; V: 0.04%; Ti: 0.05%; Nb: 0.05%; B: 0.005%; and other alloying constituents: 0.05%.

6. The method according to claim 5, wherein the upper limit for weight proportion of titanium (Ti) is less than 0.02% and the upper limit for weight proportion of niobium (Nb) is less than 0.02%.

7. A ring-pull top produced by the method according to claim 1.

* * * * *